Oct. 29, 1968 KATSURO NAKAMURA 3,408,639

MAGNETIC MEMORY DEVICE

Filed May 24, 1965 5 Sheets-Sheet 1

INVENTOR
Katsuro Nakamura

BY

H. Edward Masters

Oct. 29, 1968 KATSURO NAKAMURA 3,408,639

MAGNETIC MEMORY DEVICE

Filed May 24, 1965 5 Sheets-Sheet 2

INVENTOR
Katsuro Nakamura
BY
H. Edward Masters

INVENTOR
Katsuro Nakamura
BY
H. Edward Mestern

Oct. 29, 1968 KATSURO NAKAMURA 3,408,639

MAGNETIC MEMORY DEVICE

Filed May 24, 1965 5 Sheets-Sheet 4

INVENTOR
Katsuro Nakamura

BY

H. Edward Masters

United States Patent Office 3,408,639

Patented Oct. 29, 1968

3,408,639
MAGNETIC MEMORY DEVICE

Katsuro Nakamura, Tokyo-to, Japan, assignor to Toko Kabushiki Kaisha, Tokyo-to, Japan, a joint-stock company of Japan Filed May 24, 1965, Ser. No. 458,845
5 Claims. (Cl. 340—174)

This invention relates to magnetic memory devices and more particularly to a magnetic memory device of the type comprising a plurality of magnetic wires (conductors provided with coatings of magnetic material) and a plurality of conductors intersecting therewith at right angles. In a large capacity magnetic memory device, a plurality of planes comprising these magnetic wires and conductors are laminated, and corresponding information lines (which may be either said magnetic wires or conductors) of all planes are connected in series. To read out stored information, a word drive pulse is caused to flow through a word line associated with a particular bit to generate an induced voltage or an output signal in the information line. However, as the length of the information line is increased the time required for output signals produced at different bits along the information line to travel therethrough differ, making it difficult to properly amplify and derive out output signals at correct time phases.

Accordingly, the principal object of this invention is to eliminate such difficulty thereby to provide magnetic memory devices of simple and stable circuit construction.

Briefly stated, the above stated object and other objects can be attained by providing a plurality delay means having progressively different delay times in respective circuits extending between a word drive command pulse generating circuit and word lines thereby to compensate for the time required for read-out signals travelling through the information line.

The invention can be more fully understood from the following detailed description taken in conjunction with the accompanying drawings, in which.

Figure 1:
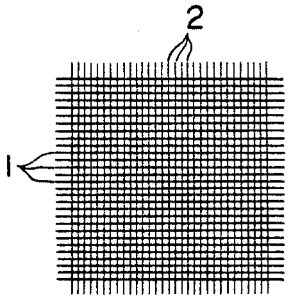
FIG. 1 is a schematic representation of a magnetic memory device utilizing magnetic wires provided with thin magnetic films to explain the relation between information lines.
Figure 2:
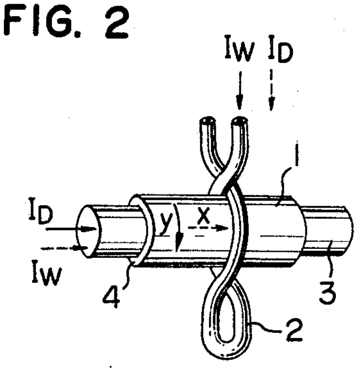
FIG. 2 is an enlarged perspective view of one bit of the magnetic memory device shown in FIG. 1.

To facilitate understanding of the invention, the magnetic memory device of the type utilizing magnetic wires provided with magnetic coating or films will be outlined by referring to FIGS. 1 to 5, inclusive. Basically the magnetic memory device of this type comprises a plurality of parallel transversal magnetic wires 1 provided with magnetic films and a plurality of parallel longitudinal conductors 2 intersecting therewith. As shown in FIG. 2 each of the magnetic wires comprises a conductor core 3 covered by a magnetic film 4, such a permalloy film, deposited thereon by electroplating, for example.

Figure 3:
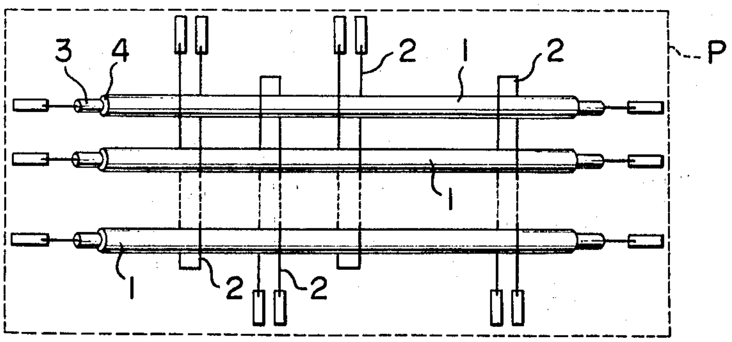
FIGS. 3 and 4 show planar views of one plane of the memory device of the woven fabric type and printed type, respectively.
Figure 4:
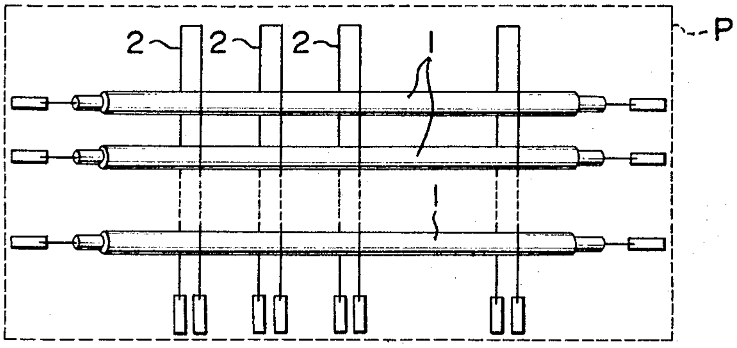
Figure 5:
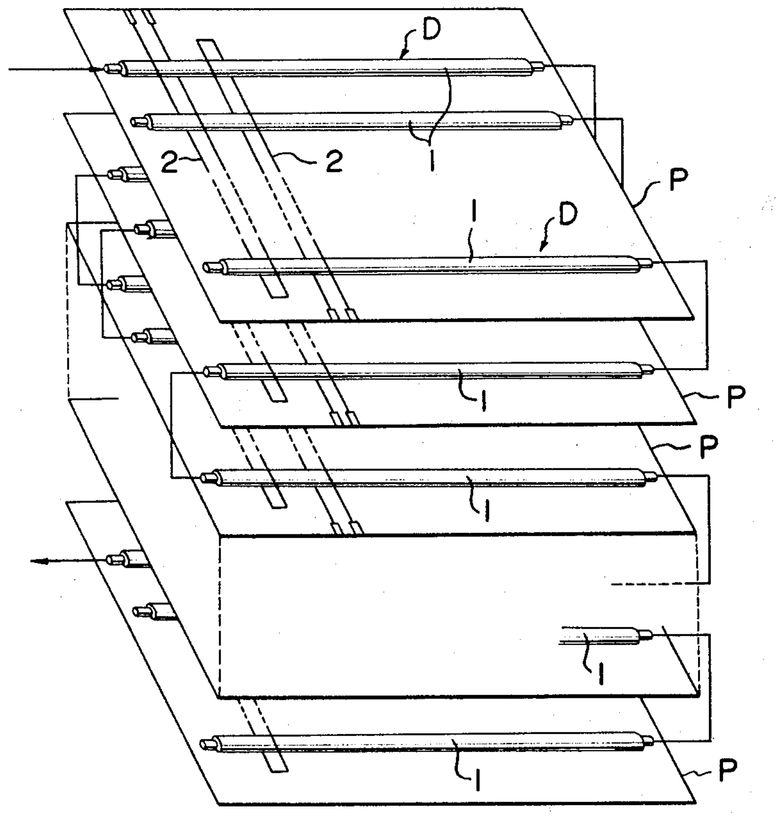
FIG. 5 shows electrical connections of a stack consisting of a plurality of laminar planes.

As the wires and conductors are required to be electrically insulated from each other, either the conductors 2 or magnetic wires 1 are provided with insulating coatings. Two types of the magnetic memory device have been used, one of them being the so-called woven fabric type wherein the magnetic wires 1 are utilized as wefts and the conductors 2 as warps, as shown in FIG. 3 (if required suitable spacer wires can be interwoven with the wefts or warps), and the other being the so-called sandwich type wherein a group of magnetic wires provided with magnetic films are covered by or sandwiched between insulator sheets printed with a group of conductors 2, as shown in FIG. 4.

When the easy axis of the magnetic wire 1 is in the circumferential direction $y$ thereof as shown by a solid arrow $y$ in FIG. 2, the magnetic wire 1 is utilized as an information line (combined digit line and sense line) and the conductor 2 as a word line. On the other hand, when the easy axis is in the axial direction $x$ of the conductor core shown by a broken line arrow, the magnetic wire 1 is utilized as a word line and the conductor 2 as an information line. In the following description, information lines will be designated by D and word lines by $W_1, W_2 \ldots$ In FIG. 5, a plurality of planes P as shown in FIGS. 3 or 4 are laminated to increase memory capacity, in which case corresponding information lines D in all planes are connected in series.

Figure 6:
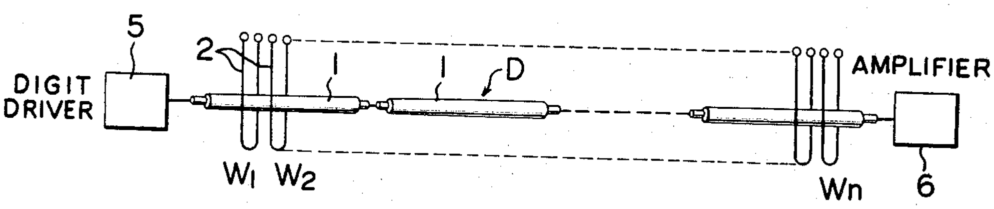
FIGS. 6 and 7 are opened out views of information lines of laminated planes of magnetic memory devices constructed in accordance with this invention.
Figure 7:
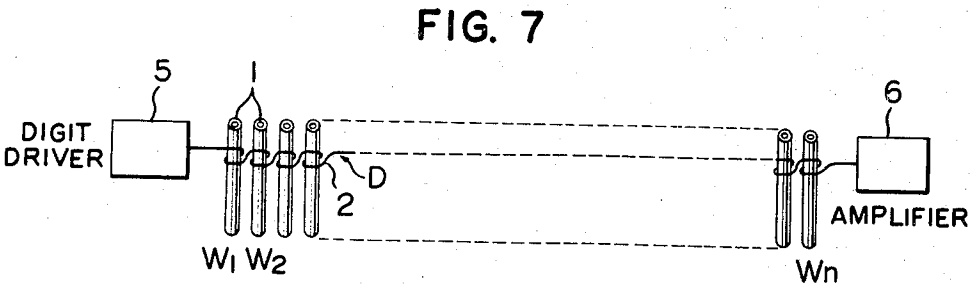

FIGS. 6 and 7 are developmental views of groups of serially connected information lines D. In FIG. 6 magnetic wires provided with magnetic films are utilized as the information lines (corresponding to FIG. 5), whereas in FIG. 7 conductors 2 are utilized as the information lines. In these figures, the reference numeral 5 indicates a digit driver (writing information amplifier) and 6 an amplifier to amplify read-out signals.

When information lines of all planes are connected in series in this manner, the total lengths of the information lines D becomes substantial, so that the time necessary for the read-out signals or digit pulses to travel through it becomes appreciable.

In order to indicate this reason more fully, an outline regarding the method of writing and read-out of the memory device of the kind referred to above will be described.

Figure 8:
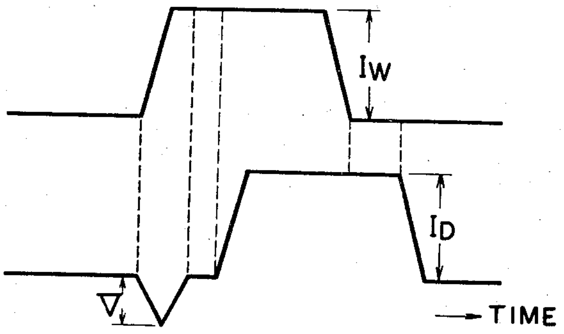
FIG. 8 is a graph of pulse patterns showing the relationship between a word driving pulse, a digit pulse and a read-out signal.

In order to write or store an information in a certain bit it is necessary to pass a word drive pulse $I_W$ through a word line associated with said particular bit so as to create a magnetic field in the magnetic film 4 in the direction of the hard axis which is orthogonal to the direction of the easy axis and to pass a positive or negative digit pulse $I_D$ while the word drive pulse is flowing, it being understood that the digit pulse $I_D$ should be interrupted subsequent to the interruption of $I_W$. In other words, the magnetic field created by the pulse $I_W$ in the direction of hard axis is shifted by the pulse $I_D$ in the direction of positive or negative (1 or 0) easy axis at the instant when the pulse $I_W$ is interrupted. Thus, for the write-in, it is essential to cause a word drive pulse $I_W$ and a digit pulse $I_D$ to occur substantially concurrently with a slight time difference, as shown in FIG. 8.

However, as the length of the information line D increases as described above, the phase relationship between the word drive pulse $I_W$ and the digit pulse $I_D$ will become different from the normal condition for a particular position of the word line owing to the time delay in the digit line, whereby write-in becomes difficult or impossible.

To read out a written information, a word drive pulse $I_W$ is passed through a word line associated with a particular bit to generate an induced voltage or a read-out signal in an information line due to flux change in the magnetic film 4 at said bit. However, where the length of the information line D is long, the time required for the read-out signal to reach the amplifier 6 via the information line D may be different depending upon the position of the particular bit, so that it becomes difficult to amplify and extract the read-out signals by applying strobe pulses at a definite interval.

It is, therefore, an object of this invention to solve such a problem occurring in a large capacity magnetic memory device utilizing magnetic wires provided with magnetic films.

Figure 9:
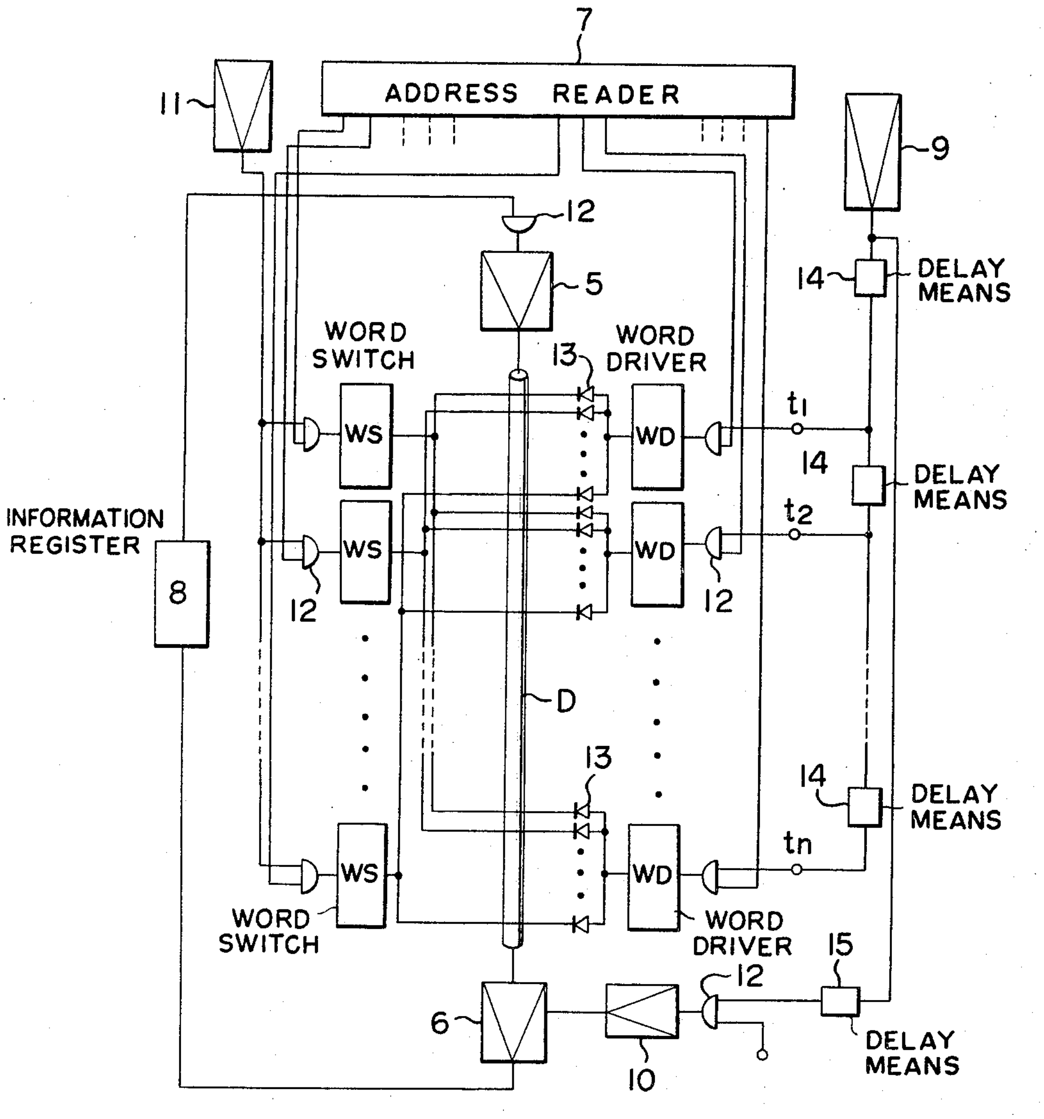
FIGS. 9 and 10 are schematic diagrams showing different embodiments of this invention.

Referring now to FIG. 9 illustrating one set of information lines D which are connected in series throughout all planes in lamination, numeral 5 designated a digit driver, 6 an amplifier, 7 a conventional address reader, 8 an information register, WD and WS a word driver and a word switch, respectively, connected to a word line, 9 a word drive command pulse generating circuit, 10 a strobe pulse generating circuit, 11 a word pulse command pulse generating circuit, 12 a gate circuit, and 13 diodes connected to the respective word lines.

While the above described circuit arrangement is well known in the art, in accordance with this invention a delay means 14 is included in each circuit extending between the word drive command pulse generating circuit 9 and a word line.

It is essential to select the time delay exhibited by the delay means 14 in such a manner that the sum of the time required for a signal generated by the word drive command pulse generating circuit 9 to reach the word line and the time required for a read-out signal to reach the amplifier from a bit is constant for all word lines. Stated in another way, in a plurality of word lines, the time delay of the delay element associated with those situated closer to the amplifier 6 is larger than those situated remotely.

In FIG. 9 a delay means 15 is included in a circuit extending between the word drive command pulse generating circuit 9 and the strobe pulse generating circuit 10.

Figure 10A:
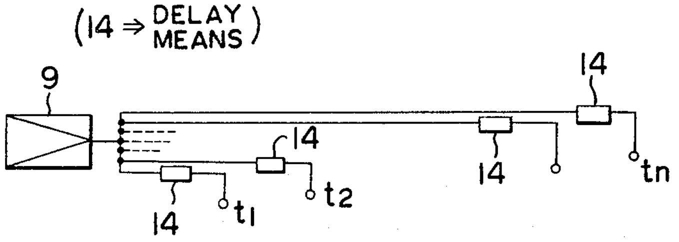
Figure 10B:
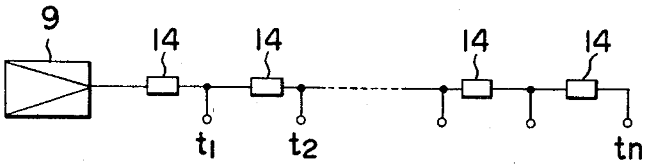
Figure 10C:
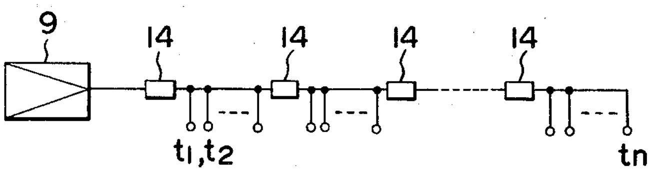
Figure 10D:
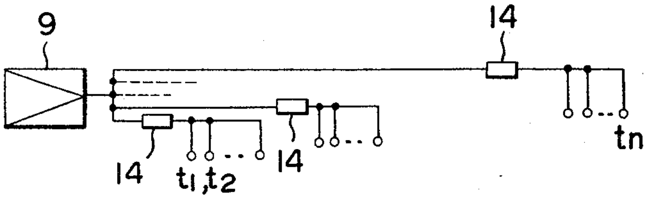

FIG. 10 shows various methods of connecting the delay means, wherein FIG. 10*a* shows an arrangement for connecting an independent delay means in each word line, FIG. 10*b* corresponds to FIG. 9 and shows an arrangement wherein a number of delay means 14 are connected in series to add their delay times, and wherein each of the word lines is connected to different junctions between adjacent delay means, and FIGS. 10*c* and 10*d* show other arrangements wherein the delay means is associated with each block or group of word lines. In these figures terminals $t_1 \ldots t_n$ corresponds to terminals $t_1 \ldots t_n$ shown in FIG. 9.

Especially in the case shown in FIG 10*b*, it is sufficient to connect a delay means which provides a definite delay time for each word driver so that a section of a coaxial cable, a fraction of a meter in length, can provide enough delay of approximately several nanoseconds.

While in FIG. 9 the delay means 14 is included between the word drive command pulse generating circuit 9 and the word driver WD, it is possible to connect it in the word selecting circuit.

In either case, by sending digit pulses $I_D$ and utilizing word drive command pulses which are generated at definite intervals, the word driving pulses $I_W$ are caused to be delayed by the time required for the digit pulses $I_D$ to travel so that word driving pulses $I_W$ and digit pulses $I_D$ of all word lines will coincide with a definite time phase relation as shown in FIG. 8 irrespective of how long the information line D may be.

As a consequence, regardless of the particular word line selected, it is possible to write information correctly under a definite condition while maintaining a strict time relationship between the word drive pulse $I_W$ and the digit drive pulse $I_D$, so that it is possible to select the minimum required width of these pulse $I_W$ and $I_D$.

Moreover, during reading out, the sum of the time required for the word driving command pulse to reach the word line and the time required for the read-out signal to travel from a memory bit to the amplifier 6 is always constant. Therefore, it is possible to accurately detect the read-out signal by causing strobe pulses of narrow width to act upon only the read-out signal at a definite time interval, to be amplified by the amplifier.

Reduction of the width of the pulses $I_W$ and $I_D$ and of the strobe pulse is not only effective to reduce the power loss in the transistors and other circuit elements utilized but also enables economical fabrication of the circuit arrangement.

While the invention has been described with reference to preferred embodiments thereof, it is to be understood that many changes and modifications may be made therein without departing from the true spirit and scope of the invention as defined in the appended claims. For example the delaying system described above can be applied not only to a destructive read-out system but also to a non-destructive read-out system.

What I claim is:

1. A magnetic memory device comprising: a plurality of laminated memory planes, each of said planes consisting of a plurality of transverse magnetic wires provided with magnetic films and a plurality of longitudinal conductors intersecting said magnetic wires, said magnetic wires and conductors acting as either information lines or word lines, coresponding information lines in the respective planes being connected in series; a word drive commanding pulse generating circuit; and a plurality of delay means having progressively different delay times included in the respective circuits extending between said word drive command pulse generating circuit and said word lines thereby to compensate for the time required for signals to travel through said information lines.

2. The magnetic memory device according to claim 1 wherein each of said delay means is connected between said word drive command pulse generating circuit and each of said word lines.

3. The magnetic memory device according to claim 1 wherein said delay means are connected in series between said word drive command pulse generating circuit and said plurality of word lines, and wherein each of said word lines is connected to the junction between adjacent series connected delay means.

4. The magnetic memory device according to claim 1 wherein said delay means are connected in series, and a plurality of word lines are connected to each junction between adjacent series connected delay means.

5. The magnetic memory device according to claim 1 wherein a plurality of delay means are connected to said word drive command pulse generating circuit, and a plurality of groups of word lines are connected to each delay means.

References Cited

UNITED STATES PATENTS 3,270,326 8/1966 Schwartz et al. ______ 340—174

OTHER REFERENCES

Atwood, L. W.: Crosstalk Elimination, IBM Technical Disclosure Bulletin, 3(10), pp. 105–106, March 1961.

Bradley, E. M.: Properties of Films for Memory Systems, Journal of Applied Physics, 33(3), pp. 1051–1056, March 1962.

BERNARD KONICK, *Primary Examiner.*

G. M. HOFFMAN, *Assistant Examiner.*